United States Patent [19]
Al-Samadi et al.

[11] Patent Number: 5,501,798
[45] Date of Patent: Mar. 26, 1996

[54] MICROFILTRATION ENHANCED REVERSE OSMOSIS FOR WATER TREATMENT

[75] Inventors: Riad A. Al-Samadi, Burlington; Andrew Benedek, Toronto, both of Canada

[73] Assignee: Zenon Environmental, Inc., Burlington, Canada

[21] Appl. No.: 225,454

[22] Filed: Apr. 6, 1994

[51] Int. Cl.⁶ .................................................. B01D 61/00
[52] U.S. Cl. ....................... 210/652; 210/641; 210/638; 210/650; 210/651; 210/705; 210/712; 210/714; 210/749
[58] Field of Search .................... 210/651, 652, 210/650, 705, 712, 714, 733, 737, 195.2, 805, 688, 712, 638, 700, 641, 749

[56] References Cited

U.S. PATENT DOCUMENTS

| | | | |
|---|---|---|---|
| 3,799,806 | 3/1974 | Madsen | 210/641 |
| 4,000,065 | 12/1976 | Ladha et al. | 210/651 |
| 4,014,787 | 3/1977 | Shorr | 210/651 |
| 4,083,779 | 4/1978 | Combe et al. | 210/641 |
| 4,155,845 | 5/1979 | Ancelle et al. | 210/650 |
| 4,176,057 | 11/1979 | Wheatley et al. | 210/652 |
| 4,276,176 | 6/1981 | Shorr | 210/651 |
| 4,338,200 | 7/1982 | Zeijlstra | 210/737 |
| 4,610,790 | 9/1986 | Reti et al. | 210/636 |
| 4,655,928 | 4/1987 | Milton et al. | 210/651 |
| 4,775,477 | 10/1988 | Stahl et al. | 210/641 |
| 5,009,789 | 4/1991 | Helmer | 210/641 |
| 5,017,291 | 5/1991 | Semler et al. | 210/641 |
| 5,043,072 | 8/1991 | Hitotsuyanagi et al. | 210/650 |
| 5,112,489 | 5/1992 | Hartmann | 210/195.2 |
| 5,156,739 | 10/1992 | Dawson et al. | 210/500.23 |
| 5,158,683 | 10/1992 | Lin | 210/651 |
| 5,182,023 | 1/1993 | O'Connor et al. | 210/652 |
| 5,250,182 | 10/1993 | Bento et al. | 210/641 |
| 5,256,303 | 10/1993 | Zeiher et al. | 210/699 |
| 5,266,203 | 11/1993 | Mukhodadhyay et al. | 210/652 |
| 5,358,640 | 10/1994 | Zeiher et al. | 210/639 |

FOREIGN PATENT DOCUMENTS

| | | |
|---|---|---|
| 53025280 | 8/1976 | Japan . |
| 57197085 | 5/1981 | Japan . |

*Primary Examiner*—Ana M. Fortuna
*Attorney, Agent, or Firm*—Andrew Alexander

[57] ABSTRACT

Disclosed is an improved method for extending the useful life of a reverse osmosis membrane having a high pressure side and a low pressure side, the membrane used for separating soluble and sparingly soluble inorganic materials from an aqueous solution, the process comprising introducing an aqueous solution containing the soluble and sparingly soluble inorganic materials to the high pressure side of a reverse osmosis membrane and pressurizing the aqueous solution on said high pressure side to produce liquid on the low pressure side substantially free of said inorganic materials. Solution containing concentrated inorganic materials is transformed from the high pressure side of the reverse osmosis membrane to a high pressure side of a microfiltration membrane, and soluble inorganic materials transferred to the high pressure side of the microfiltration membrane was precipitated to provide solution containing particles of the inorganic materials.

22 Claims, 3 Drawing Sheets

MICROFILTRATION ENHANCED REVERSE OSMOSIS FOR WATER TREATMENT

BACKGROUND OF THE INVENTION

This invention relates to purification of aqueous solution containing soluble inorganic materials and more particularly, this invention relates to more efficient or enhanced membrane filtration of such solutions.

One of the problems with membrane filtration such as reverse osmosis filtration of aqueous solutions containing soluble inorganic material is the clogging of the membrane. That is, one of the most serious technical limitations of using reverse osmosis membranes to achieve high water recovery from a natural water source such as water wells or aquafers, municipal water supply or industrial wastewater stream is the potential precipitation of insoluble or sparingly soluble inorganic salts that form scale on the membrane as these compounds are concentrated many-folds (typically 10–20 times, not withstanding osmotic pressure limitations). These scalants (scale forming materials) can be the carbonate, sulphate or fluoride salts of calcium, barium, strontium and magnesium. Soluble silica is also a known scalant forming material because solubility is on the order of 100 mg/L at standard conditions of temperature and pH. In addition, RO membrane fouling due to ferric hydroxide formation at the surface of the membrane has been a problem for many applications because iron is present in most industrial waters.

For purposes of purifying aqueous streams contaminated with organic materials, U.S. Pat. No. 4,000,065 discloses the use of a combination of reverse osmosis (RO) and ultrafiltration (UF) to separate the organic material from the aqueous stream. The contaminated aqueous stream is circulated from the high pressure compartment of a RO unit to the high pressure compartment of an ultrafiltration unit, then to the low pressure compartment of the ultrafiltration unit, and then back to the high pressure compartment of the RO unit.

Japanese Patent 57-197085 discloses a filtration apparatus that comprises connecting ultrafiltration apparatus and a reverse osmosis apparatus in series so as not to deposit scale on the osmosis membrane.

U.S. Pat. No. 3,799,806 discloses purification of sugar juices by repeated ultrafiltration and reverse osmosis.

U.S. Pat. No. 4,083,779 discloses a process for treatment of anthocyante extracts by ultrafiltration and reverse osmosis treatments.

U.S. Pat. No. 4,775,477 discloses a process for extraction of cranberry presscake wherein the presscake is ground and subjected to microfiltration to remove colloidal high molecular weight compounds followed by reverse osmosis to recover a red-colored solution.

U.S. Pat. No. 5,182,023 discloses a process for removing arsenic from water wherein the water is first filtered to remove solids then passed through an ultrafilter, followed by a chemical treatment to adjust pH to a range from about 6 to 8. Thereafter, anti-scalants and anti-fouling materials are added before subjecting the water to reverse osmosis to provide a stream having less than about 50 PPB arsenic.

Japanese Patent 53025-280 discloses the separation of inorganic and organic compounds from a liquid by first using a reverse osmosis membrane and then using a second reverse osmosis membrane having a more permeable membrane such as a microporous or ultrafiltration membrane. Part of the concentrated liquid obtained from the first membrane is processed through the second membrane.

To minimize the effect of insoluble or sparingly soluble salts that result in scalants or foulants that affect the reverse osmosis membrane, many different treatments have been used. Treatments include filtration, aeration to remove iron, and pH adjustment to prevent carbonate scale formation. Anti-scalants such as polyacrylic acid, EDTA and sodium hexametaphosphates are used to control formation of divalent metal fluorides, sulphates, silica and residual iron hydroxides. However, this approach is often not practical because of the cost of the anti-scalants. In addition, many times the anti-scalants are not compatible in certain applications. Further, they often are required to operate in a narrow pH range and are not tolerant of other materials, e.g., polymeric anti-scalants usually are not effective in the presence of iron. Also, in many cases, the antiscalants are not effective when the concentration of sparingly soluble salts exceeds the saturation solubility by many fold (e.g., 5–10 times). Thus, it will be seen that this approach alone is not very desirable because it has only limited effectiveness.

For purposes of the present invention, foulants are regarded as solids contained in the liquid that accumulate on the surface of the reverse osmosis membrane. Scalants are regarded as sparingly soluble inorganic compounds that can exceed their solubility limit and can result in a concentration gradient across the thickness of the reverse osmosis membrane. Scalants or sparingly soluble inorganic compounds can precipitate or deposit in situ of the membrane in small crystals that bind tightly to membrane surfaces making their removal extremely difficult, if not impossible, and severely limit flow of liquid through the membrane. Often, solution or chemicals required to remove or dissolve the scalants adversely affect the membrane. Thus, the formation of scale can lead to the eventual loss of the membrane.

Thus, there is a great need for a process or system that will enhance the useful life of the reverse osmosis membrane by removing insoluble or sparingly soluble inorganic salts from an aqueous solution and yet permit 90% to 99% liquid recovery in an economical manner.

SUMMARY OF THE INVENTION

It is an object of the invention to provide an improved process for purifying liquids containing insoluble or sparingly soluble inorganic salts.

It is another object of the invention to provide an improved process using a reverse osmosis membrane for purifying water containing insoluble and soluble inorganic salts wherein the membrane has greatly extended useful life.

It is still another object of the invention to provide an improved reverse osmosis process RO for purifying water containing soluble and insoluble salts wherein 90% to 99% of the liquid can be recovered and the useful life of the RO membrane can be greatly extended.

Yet, it is another object of the invention to provide an improved reverse osmosis process for purifying water containing soluble and insoluble salts wherein the RO membrane can be operated with substantial freedom from formation of scalants.

And yet, it is another object of the invention to provide an improved reverse osmosis process for purifying water containing soluble and insoluble salts wherein the RO membrane can be operated to provide 90% to 99% recovery with substantial freedom from formation of scalants in the membrane and wherein a cross flow microfiltration membrane, ultrafiltration membrane or a dead-end cartridge filter preferably in the microfiltration range is selectively used to separate solids from the water.

These and other objects will become apparent from the specification, claims and drawings appended hereto.

In accordance with these objects, there is provided an improved method for extending the useful life of a reverse osmosis (RO) membrane having a high pressure side and a low pressure side, the membrane used for separating soluble inorganic materials from an aqueous solution. The process comprises introducing an aqueous solution containing the soluble inorganic materials to the high pressure side of a reverse osmosis membrane and pressurizing the aqueous solution on the high pressure side to produce liquid on the low pressure side substantially free of the inorganic materials. Solution containing concentrated inorganic materials is transferred from the high pressure side of the reverse osmosis membrane to a high pressure side of a microfiltration membrane. Sparingly soluble inorganic materials transferred to the high pressure side of the microfiltration membrane are precipitated to provide a solution containing particles of precipitated, sparingly soluble inorganic materials. The solution in the high pressure side of said microfiltration membrane is pressurized to pass solution through the microfiltration membrane to a low pressure side thereby providing purified solution normally containing only highly soluble inorganic materials which do not precipitate on the RO membrane. The particles of said precipitated sparingly soluble inorganic materials are concentrated on the high pressure side of the microfiltration membrane. Thereafter, the concentrated particles of the precipitated inorganic materials are removed from the high pressure side of the microfiltration membrane.

DETAILED DESCRIPTION OF THE PREFERRED EMBODIMENTS

In conventional reverse osmosis (RO) systems, the percent recovery of permeate is usually limited by the soluble or sparingly soluble constituent or the inability of the soluble or sparingly soluble constituent to stay in solution as the concentration of said constituent increases in the high pressure side of the membrane. The soluble or sparingly soluble constituent has a fraction thereof that eventually precipitates out in the membrane, resulting in a decrease in liquid that permeates the membrane. Often, materials are added to the liquid to increase the solubility of the sparingly soluble constituent. However, eventually, the saturation point is reached and precipitation results. Even with the addition of antiscalants, precipitation can occur on the membrane because of the concentration of soluble or sparingly soluble constituent at the membrane surface as said soluble constituent is rejected or separated by the membrane. In these prior processes, precipitation on the membrane was essentially not controlled, except by the addition of antiscalants or by inefficient operation at reduced recovery rates with the eventual replacement of the membrane.

In the present invention, solubility and precipitation of the said soluble constituent is controlled so as to avoid precipitation of the soluble or sparingly soluble constituent on the membrane and to provide for precipitation of the soluble constituent exterior to the high pressure side of the RO membrane such as by using a microfiltration membrane.

Figure 1:
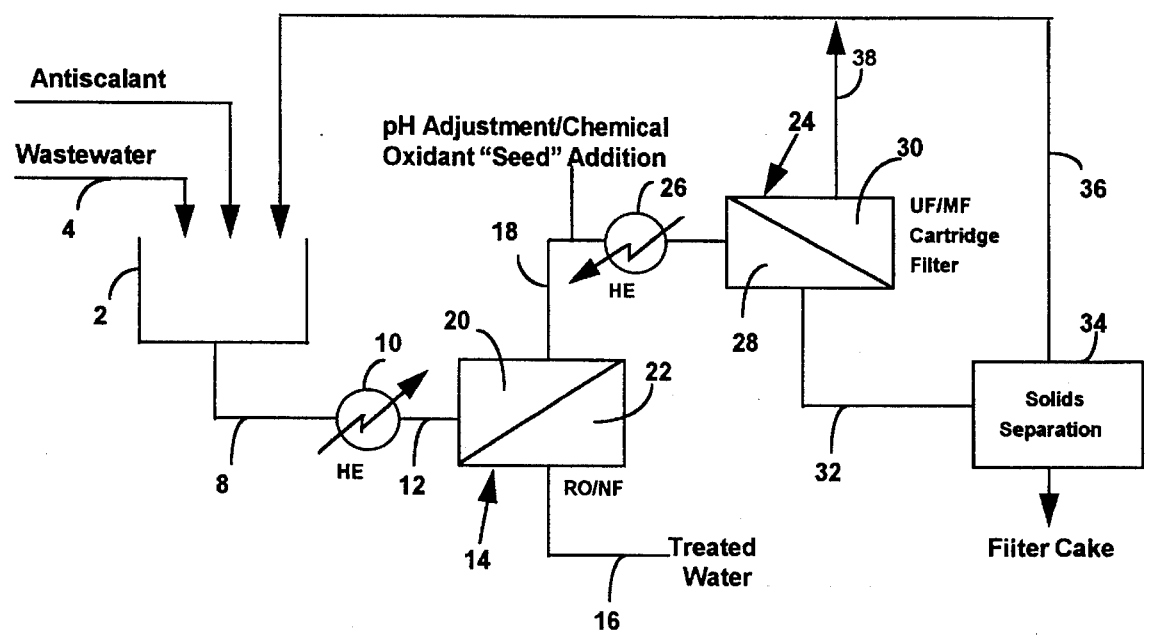
FIG. 1 is a schematic representation of a high recovery RO membrane followed by a second membrane system for purifying water containing soluble and sparingly soluble inorganic materials.

Thus, for example, by reference to FIG. 1, there is provided a schematic illustrating the process of the invention utilizing a high recovery RO membrane followed by a small microfiltration membrane. In FIG. 1, there is provided a container 2 into which waste water stream 4 is introduced. If stream 4 contains suspended solids, a prefiltration device such as an MF membrane, sand-bed filtration with or without flocculant addition, dead-end cartridge filtration or a combination of these may be used to remove the suspended solids that may foul the RO membrane. In this process, an antiscalant 6 may be introduced to container 2, if desired. Liquid having soluble and sparingly soluble constituents is withdrawn from container 2 along line or conduit 8 and pumped along pipe 12 by high pressure pump 10 to reverse osmosis unit or chamber 14. The liquid is introduced to high pressure side 20 of RO membrane chamber 14. In chamber 14, the RO membrane rejects the soluble and sparingly soluble constituents such as soluble salt to provide purified liquid or permeate on low pressure side 22 of the RO membrane. The permeate is removed along line 16. By rejecting the soluble and sparingly soluble constituents, the RO membrane provides a retentate that is removed along line 18. The retentate is removed from the high pressure side of the RO membrane at a rate sufficient to avoid precipitation of the sparingly soluble constituent on the membrane with its attendant problems. That is, the rate of removal from high pressure 20 is important to avoid precipitation on the membrane and to avoid interference with its ability to operate at high efficiency. The retentate can contain high levels of the sparingly soluble constituent or even be supersaturated as long as its removal is effected at a rate that avoids precipitation. After removal of the retentate along line 18, a precipitating agent such as sodium hydroxide, magnesium hydroxide, ammonia, sodium carbonate, calcium hydroxide and like chemicals that will reduce the solubility of the sparingly soluble salts, is added that effects precipitation of the soluble constituent. The precipitating agent may be added to high pressure side 28 of chamber 24 as long as precipitation is effected.

Chamber 24 may comprise any filtration means that is effective in removing the precipitate. Thus, preferably, the filtration means can comprise a crossflow ultrafiltration (UF) membrane, a crossflow microfiltration (MF) membrane or a dead-end cartridge-type filter. Thus, retentate is pumped by pump 26 to the high pressure side 28 of filter means 24 where the filter means rejects the solid particles in high pressure side 28 and provides a purified liquid on low pressure side 30. The solid particles or precipitate is removed from the high pressure side of chamber 24 along line 32 to solid separator 34. The solid particles removed along line 32 contain a large amount of liquid that can be removed by solid separator 34. Solid separator 34 can comprise any means such as a filter press, a hydroclave, a cartridge or rollers that squeeze liquid from the solid particles through a filter cloth. The solids may conveniently be disposed of as filter cake, and liquid removed therefrom can be recirculated along line 36 to be reintroduced to container 2. In addition, filtrate in low pressure side 30 of filtration means 24 can be removed along line 38 to join line 36 and be introduced therewith to container 2. Thus, it will be seen that regardless of the feedstock, very high levels of liquid recovery can be obtained. That is, the system in accordance with the present invention can permit 70% to 80% and even 90% to 99% recovery of liquid or wastewater entering container 2. Additionally, the process provides for greatly extended membrane life because it is much less subject to fouling with a sparingly soluble constituent precipitating on the membrane. Further, the present invention is only limited by the levels of pressure due to the highly soluble materials that may be exerted on the membrane and is not limited by precipitation or scaling of the reverse osmosis membrane. Thus, instead of permitting uncontrolled precipitation, the present invention provides for controlled precipitation in a zone that does not adversely affect the reverse osmosis (RO) membrane. Further, if it is not desirable to add additional chemicals to the system, precipitation can be made to occur in high pressure side 28 of filtration means 24 by supersaturation and seeding or by heating of the retentate, thereby effecting removal of the sparingly soluble constituent and return of filtrate containing highly soluble, non-fouling and non-scaling materials to the beginning of the process.

In the present invention, the solubilizing agents or antiscalants can be added separately from the precipitation agents to avoid interference. That is, these two functions are advantageously separated so as to obtain optimum results.

Figure 2:
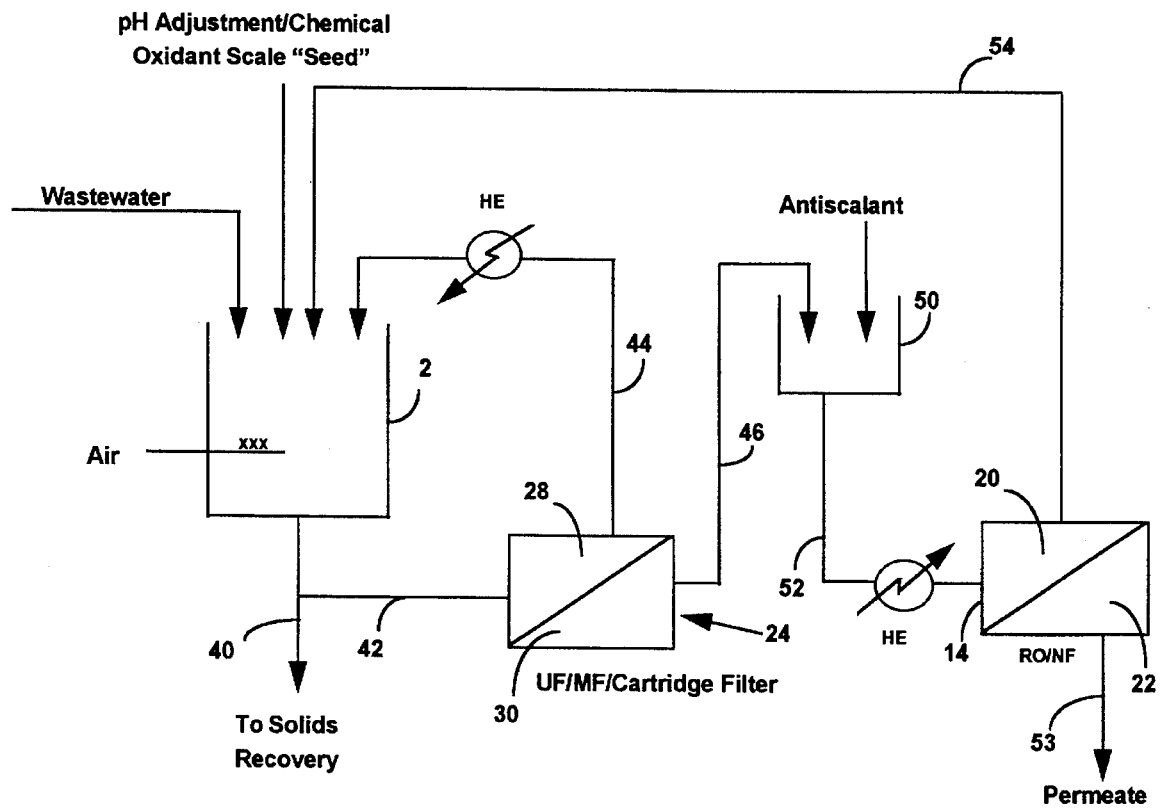
FIG. 2 is a schematic representation of a microfiltration system followed by a high recovery RO membrane for purifying water containing soluble and sparingly soluble inorganic materials.

By reference now to FIG. 2, which represents a MF membrane, for example, followed by high recovery RO membrane, there is provided another embodiment of the present invention wherein like numbers designate like functions as in FIG. 1. Thus, there is provided a container 2 for receiving liquid, e.g., hard water containing silica, calcium carbonate, calcium sulfate and suspended solids or wastewater containing the same, to be purified. In this embodiment, a precipitating agent, such as seed, pH adjustment or addition of an oxidant (and/or heating), is introduced at container 2. Solid precipitate is removed along line 40 after dewatering, if desired. Wastewater and suspended precipitate or solids are moved along line 42 into the high pressure side 28 of filtration chamber 24 wherein the precipitate is separated from the liquid to provide filtrate. Again, the filtration chamber can comprise any filtration means that is effective in removing the precipitate. Preferably, the filtration means can comprise an ultrafiltration (UF) membrane, a microfiltration (MF) membrane or a cartridge-type filter. The filter means rejects the solid particles in high pressure side 28 of filter chamber 24 and provides a substantially precipitate or solid particle-free filtrate in low pressure side 30. The solid particles or precipitates are removed from the high pressure side of filtration chamber 24 along line 44 and recirculated back to container 2 where it is subsequently treated. The concentration of suspended solids or particulate is controlled by removing a small bleed stream containing said solids via stream 40 and transferring it to a solids separation device. Precipitate-free filtrate from filtration chamber 24 is removed along line 46 to an RO feed tank 50 where acid is added to lower the pH and a solubilizing dispersant or antiscalant material can be added, if desired, to ensure against subsequent precipitation when the remaining sparingly soluble constituents are being concentrated. Liquid is transferred along line 52 and pumped into high pressure side 20 of RO membrane chamber 14 and may be pumped via a cooling heat exchanger (HE) intended to restore the stream temperature to its original value. In chamber 14, the reverse osmosis membrane rejects the soluble and sparingly soluble constituents to provide purified liquid or permeate on low pressure side 22 of the reverse osmosis membrane that is removed along line 53. By rejecting the soluble and sparingly soluble constituents, the RO membrane provides a retentate that is removed along line 54 to container 2.

In accordance with the invention, the retentate is removed from the high pressure side of the RO membrane at a rate sufficient to avoid precipitation of the sparingly soluble constituents on the membrane as noted earlier. Thus, the retentate is removed to container 2 where precipitation of the sparingly soluble constituents are made to occur in a location remote from the RO membrane. This embodiment has the same advantages as noted earlier but also has the additional advantage that all suspended solids and particulate already existing in the influent as well as the solid precipitate formed in container 2 are removed from the system without coming in contact with the RO membrane. This minimizes the fouling of the RO membrane as well as minimizing scaling. Thus, the RO membrane has a remarkably extended life and the liquid recovery in the system can be extended to 90% to 99%. The process is no longer limited by the amount of sparingly soluble constituent that can be tolerated in the high pressure side of the RO membrane before precipitating out in the membrane as noted earlier.

Sparingly soluble constituent as referred to herein includes carbonates, silicates, sulphates, phosphates, fluorides and hydroxides of metals such as aluminum, barium, calcium, magnesium, strontium, less frequently those of chromium, copper, lead, nickel, silver, tin, titanium, vanadium, zinc and other multivalent cations of the periodic table.

By sparingly soluble salts is meant salts that will precipitate out on the RO membrane when concentrated, for example, two to four times, depending on whether an antiscalant is used. The sparingly soluble salts are distinguished from highly soluble salts that will pass through the RO membrane and, therefore, do not precipitate on the membrane.

Other soluble constituents that may be treated include salts of organic materials such as, for example, salts of carboxylic acid, polymeric compounds (polyelectrolytes that may exist in salt forms), alcohols and hydrocarbons.

Figure 3:
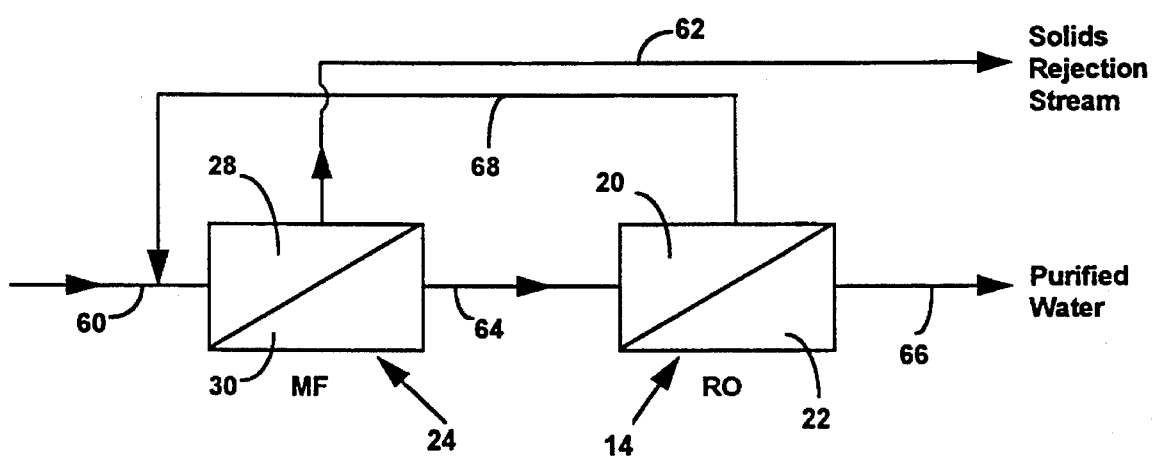
FIG. 3 is a schematic representation of microfiltration membrane followed by a low recovery RO system for purifying water containing soluble and sparingly soluble inorganic materials, the purifying being accomplished without use of additives such as antiscalants.

In certain instances, it may not be desirable to add antiscalants or chemicals to cause precipitation of the sparingly soluble constituents contained in concentrate removed from the high pressure side of the RO membrane. Thus, FIG. 3 provides another embodiment of the invention in which the system can be operated without antiscalants or chemicals to cause precipitation. In this embodiment involving a microfiltration membrane followed by a low recovery RO membrane, influent such as wastewater (or hard water from a natural source containing suspended solids) is introduced along line 60 to high pressure side 28 of filtration chamber 24 where the solids are separated from the liquid. The solids are removed along line 62 and may be de-watered and the liquid returned to line 60, if desired. Liquid in low pressure side 30 is transferred along line 64 to high pressure side 20 of RO membrane in chamber 14. Purified water or permeate is removed along line 66, and retentate is withdrawn from high pressure side 20 along line 68 and re-introduced to line 60. The retentate is withdrawn at a rate sufficient to avoid precipitation of crystals on the RO membrane. Typically, retentate is withdrawn at a rate of 50% to 500% of the rate of flow to RO membrane chamber. In this way, the liquid in high pressure side 20 is not permitted to reach saturation to the point where precipitation of crystals occurs on the RO membrane. Prevention of crystal formation on the surface of the RO membrane is further ensured by the addition of antiscalant (crystal modifier) which will act as a dispersant that prevents scaling. Formation of non-scaling particles on the high pressure side of the RO membrane will not be detrimental to the membrane because these particles will be transferred to the high pressure side of the MF membrane where they are efficiently separated, thereby preventing their accumulation on the RO membrane. That is, this system requires a high flow recycle rate of retentate from the high pressure side of the RO membrane. This system has the capability of 50% to 80 or 90% recovery of liquid. However, the RO membrane operates at low recovery rate, for example, less than 15%. The low recovery is necessary to avoid precipitation on the RO membrane. In this system, precipitation (not shown) of the retentate may be made to occur external to the RO membrane chamber for purposes of lowering the level of soluble constituent and enhancing the recovery from the RO membrane. Thus, as noted earlier, instead of recovery being controlled by sparingly soluble salts, recovery is now controlled by osmotic pressure. This system has the advantage that the RO membrane will encounter more or less uniform concentrations of soluble salts throughout the RO membrane system brought about as a result of the high recycle rate and low recovery. Further, by placing the MF membrane ahead of the RO membrane, the RO membrane does not encounter suspended solids. Because of the high recycle rate of retentate from the RO membrane, high pumping power as well as a large capacity MF membrane is required in order to process both the influent and the recycled retentate. Power recovery turbines can be used in order to reduce energy consumption in the high pressure RO system.

In any of the systems described, the precipitating agent may involve the raising of the pH by the addition of caustic, for example, which results in the sparingly soluble salt being precipitated. Another method causing precipitation of the sparingly soluble constituent is addition of a seed material, such as calcium carbonate or calcium sulfate, to the concentrate being recycled from the RO membrane. A further method useful in causing precipitation of the sparingly soluble constituents is the addition of iron salts, for example, ferrous sulfate or ferric chloride, with or without aeration to precipitate insoluble ferric iron salts and to co-precipitate other sparingly soluble constituents. Addition of chemical oxidants, e.g., hydrogen peroxide, ozone and the like, can also be used to precipitate iron compounds and co-precipitate other sparingly soluble constituents. Further, precipitation of sparingly soluble constituent may be made to occur by heating the concentrate or retentate as it is recycled from the RO membrane. Precipitation in these systems may be accomplished in a vessel in line between the RO membrane chamber and the MF vessel or precipitation can be accomplished inside MF vessel 24.

In the present system, any RO membrane can be used including any spiral-wound, plate-type or tubular RO membrane such as brackish water membranes. Further, for MF membranes, any polymeric, ceramic, sintered metal or graphite MF membranes can be used, including tubular or hollow fiber having a pore size range 0.1 µm to 5 µm and preferably 0.1–1 µm. AlSo, for UF membranes, any polymeric or ceramic UF membranes (tubular or hollow fiber) having a pore size in the range of 0.005 to 0.1 µm.

In the present invention UF membranes may be substituted for MF membranes. In this instance, emulsified oil containing water can be treated as well as water containing inorganic solids. For purposes of using antiscalants, any metal sequestering agents such as polyacrylates, EDTA, sodium hexametaphosphates, etc. may be used.

Osmotic pressures in the range of 800 to 1000 psig can be used, and pressures up to 700 to 800 psig in the RO retentate can be utilized. Because spiral-wound RO membranes can be operated at up to 1000 psig, this provides a driving force of 100 to 200 psig. Plate and frame-type systems can be operated at 1200 psig, thus providing osmotic pressure range of 800 to 1000 psig.

Concentration factors up to 35 can be achieved operating at 1000 psig to provide a recovery of 97% at a total dissolved solids of 2000 ppm. If the TDS was 1000 ppm, the recovery would be 98.6% assuming a membrane wall concentration of 70,000 mg/L.

In the systems described, it is advantageous to filter the influent water or wastewater prior to purification to remove oils, greases, silt and solids.

EXAMPLE

A system for purifying wastewater was set up substantially as shown in FIG. 1. For purposes of testing the system, a synthetic feed water was formulated using city water by the addition of calcium carbonate, calcium sulphate and silica. The feed water contained total dissolved solids (TDS) 1200 mg/l, 870 mg/l $SO_4$, 230 mg/l Ca, 90 mg/l $HCO_3$, 45 mg/l $SiO_2$. A polymeric antiscalant compound (polyacrylic acid-2enotreat 150) was added at a concentration of 20 mg/L to the influent water. The process was operated for 12 days. The RO membrane was a 2.5-inch high pressure seawater polymeric spiral-wound membrane module available from Film Tec Corporation, Minneapolis, Minn., under the designation FT-30 SW 2540. The MF membrane was a Zenon hollow fiber polymeric microfiltration membrane available from Zenon Environmental, Inc., Burlington, Ontario, Canada under the designation ZW-10. The system was operated in a semi-continuous mode wherein spike city water was fed continuously to the RO membrane as in FIG. 1, and the RO permeate was continuously discharged to drain while returning the RO concentrate to container 2 via MF filtration unit 24. In this way, the concentration of the soluble and sparingly soluble materials increased as the water recovery increased. At 85% RO recovery, concentrations of the retentate in the RO tank at a pH of 8.7 were as follows: TDS was 5700 mg/l, $SO_4$ was 3300 mg/l, Ca was 1200 mg/l, $HCO_3$ was 330 mg/l and $SiO_2$ was 174 mg/l. When this concentrate was transferred to a precipitation tank and the pH adjusted to 9.9 by adding sodium hydroxide, the TDS was 4900 mg/l, $SO_4$ was 3000 mg/l, Ca was 770 mg/l, $HCO_3$ was 72 mg/l and $SiO_2$ was 38 mg/l. The RO permeate had a TDS of only 6 mg/l. Thus, it will be seen that the concentrations of sparingly soluble materials (especially $HCO_3$ and $SiO_2$) were significantly reduced. The total suspended solids (TSS) was increased from 12 ppm to 900 ppm indicating precipitation of said materials external to the RO membrane. The MF membrane flux was 50–55 gallons/sq. ft./day (gfd) at 15°–20° C. and at a slight vacuum of −6 psig and the RO flux was steady at 12–15 gallons/sq. ft./day (gfd) at 20° C. and 400 to 500 psig. These steady permeate flux data show that both the MF and RO membranes did not foul or scale at 85% to 90% recovery, in spite of the presence of high concentrations of sparingly soluble materials in the incoming water. As the overall recovery reached approximately 91%, the RO membrane flux started to decrease but only slowly, reflecting the onset of solids precipitation which is believed to be due to the high silica concentration in the RO membrane tank. Thus, it will be seen that the system can be operated at very high percent recovery without any significant decrease in flux.

In this example, since the influent water did not contain suspended solids, no pretreatment (i.e., filtration) was necessary. The temperature of the water was controlled in the range of 15° to 20° C. throughout and the RO membrane pressure was controlled in the range of 400 to 500 psig, although depending on the initial TDS and the desired recovery, a high pressure in the range of 800 to 1000 psig could be used. Further, a single 2.5-inch spiral-wound RO membrane and a single 10 sq. ft. hollow fiber MF membrane was used. The concentrate (or retentate) from the RO membrane was recycled back to container 2 (not shown in FIG. 1) at approximately 5 gpm in order to maintain the required flow velocity through the 2.5-inch RO unit. Control at the concentration of highly soluble and sparingly soluble constituents was achieved by taking a small flow (stream 18) of the recycled stream (approximately 0.2 liters per minute, corresponding to 20% of the influent, stream 4) to an external precipitation device consisting of a small stirred tank to which NaOH solution was added in order to increase and control the pH in the range of 8 to 12, preferably 10 to 11, thereby resulting in efficient precipitation of the sparingly soluble constituents. The precipitated solids were removed in the MF membrane which had an average pore size of less than 0.1 μm. The actual pH in the precipitation tank was 9.9. It should be noted that the NaOH may be added to the MF membrane tank (chamber 24) directly thereby avoiding the external precipitation tank and further simplifying the system. Precipitation may be achieved also adding an inorganic seed that will form a nucleating site for the sparingly soluble salts to precipitate on. Further, precipitation may be effected (1) by aerating or adding chemical oxidants to precipitate iron and coprecipitate sparingly soluble constituents, and (2) by heating the RO retentate stream in order to reduce the solubility of calcium carbonate/bicarbonate and silica.

In this test, the hollow fiber MF membrane was placed vertically inside an aerated tank, and the air was used to bring about upward movement of the fibers thereby preventing deposition of the precipitated sparingly soluble constituents onto the membrane. The flow of particle-free permeate through the MF membrane was achieved by applying a small vacuum of 8 to 10 psig using a permeate discharge pump. No solids discharge from the MF chamber (24) was carried out during the test period. However, in a large-scale continuous system, a small retentate stream (32) would be removed and the precipitated solids separated in an external solids separation device, as shown in FIG. 1.

The system can be improved further in order to achieve recoveries in the range of 90% to 99% by (1) reducing the pH in container 2 (FIG. 1) to 6 to 6.5 and (2) increasing the RO concentrate recycle via the MF membrane (chamber 24) to 25% to 50% of feed rate to the RO membrane. This would lower the overall concentration of sparingly soluble salts in container 2.

To further illustrate the advantage of the present invention, if $CaCO_3$ is provided at 25 mg/L in water, it can be concentrated 4 to 5 times depending on the use of an antiscalant before precipitation occurs in a conventional system. In comparison, by use of the present invention, the $CaCO_3$ may be concentrated 10 to 100 times the concentration factor.

While the invention has been described in terms of preferred embodiments, the claims appended hereto are intended to encompass other embodiments which fall within the spirit of the invention.

What is claimed is:

1. An improved method of extending the useful life of a reverse osmosis (RO) membrane having a high pressure side and a low pressure side, the membrane used for separating sparingly soluble inorganic materials from an aqueous liquid, the method capable of 90% to 99% recovery of purified liquid, comprising:

(a) introducing and aqueous liquid containing sparingly soluble inorganic materials to which have been added antiscalant to the high pressure side of a RO membrane;

(b) pressurizing said aqueous liquid on said high pressure side to produce purified liquid on the low pressure side substantially free of said inorganic materials;

(c) removing liquid containing concentrate sparingly soluble inorganic materials from the high pressure side of said RO membrane, the liquid being removed before precipitation of said concentrated sparingly soluble inorganic material on the RO membrane;

(d) recovering purified liquid as treated water on the low pressure side of said RO membrane at a rate of at least 70% the rate of introducing said aqueous liquid containing sparingly soluble inorganic materials to the high pressure side of said RO;

(e) precipitating said sparingly soluble inorganic materials removed from the high pressure side of the RO membrane to provide liquid containing inorganic precipitate;

(f) passing said liquid containing inorganic precipitate to a high pressure side of a microfiltration (MF) membrane;

(g) passing liquid form the high pressure side of said MF membrane to a low pressure side of said MF membrane thereby providing substantially precipitate-free liquid and concentrating said particles of said inorganic materials on the high pressure side of said MF membrane;

(h) removing particles of said inorganic materials from the high pressure side of said MF membrane; and (i) recirculating precipitate-free liquid from the low pressure side of said MF membrane and introducing to the high pressure side of the RO membrane thereby providing for high levels of recovery of said purified liquid and extending the life of said RO membrane.

2. The method in accordance with claim 1 including operating said RO membrane at a pressure in the range of 100 to 200 psig in excess of said membrane osmotic pressure.

3. The method in accordance with claim 1 including operating said RO membrane at a pressure in the range of 500 to 1000 psig.

4. The method in accordance with claim 1 including removing said concentrated soluble inorganic material from the high pressure side of said RO membrane at a rate in the range of 25% to 50% of the rate of said introducing an aqueous liquid containing sparingly soluble inorganic materials to said high pressure side of said RO membrane.

5. The method in accordance with claim 4 including removing said concentrated soluble inorganic material from the high pressure side of said RO membrane at a rate in the range of 20% to 30% of the rate of said introducing an aqueous liquid containing sparingly soluble inorganic materials to said high pressure side of said RO membrane.

6. The method in accordance with claim 1 including adjusting the pH of the aqueous liquid to precipitate said sparingly soluble inorganic material prior to MF.

7. The method in accordance with claim 1 including increasing the pH of the aqueous liquid to a pH in the range or 8 to 12 to precipitate said soluble inorganic material prior to MF.

8. The method in accordance with claim 1 including increasing the pH of the aqueous liquid to a pH in the range of 10 to 11 to precipitate said soluble inorganic material prior to MF.

9. The method in accordance with claim 1 including the step of adjusting the pH of the precipitate-free liquid from the high pressure side of said RO membrane to a pH in the range of 5 to 7.

10. The method in accordance with claim 1 including the step of adding an inorganic seed to said aqueous liquid removed from the high pressure side of the RO membrane to precipitate sparingly soluble inorganic material therefrom.

11. The method in accordance with claim 10 wherein said seed is selected from the group consisting of $CaCO_3$, $SiO_2$, $CaSO_4$ and $FeCl_3$.

12. The method in accordance with claim 1 including the step of heating the liquid removed from the high pressure side of said RO membrane for precipitating said sparingly soluble inorganic materials.

13. The method in accordance with claim 1 wherein said antiscalant is selected from the group consisting of polyacrylates, EDTA and sodium hexametaphosphate.

14. The method in accordance with claim 1 including the step of removing liquid from said inorganic precipitate removed from the high pressure side of said MF membrane and recirculating said liquid to said body of aqueous liquid.

15. An improved method of extending the useful life of a membrane having a high pressure side and low pressure side, the membrane used for separating sparingly soluble inorganic materials from an aqueous liquid, the method capable of providing 90% to 99% recovery of purified liquid, the method comprising:

(a) providing a body of aqueous liquid containing sparingly soluble inorganic material;

(b) precipitating a portion of said sparingly soluble inorganic material from said body of aqueous liquid to provide inorganic precipitate;

(c) introducing a stream of aqueous liquid from said body to a high pressure side of a first membrane suited to separate said inorganic precipitate from the aqueous liquid;

(d) passing aqueous liquid in said high pressure side to produce a precipitate-free liquid on a low pressure side of said first membrane, thereby concentrating said inorganic precipitate on the high pressure side;

(e) recirculating said inorganic precipitate from the high pressure side of said first membrane to said precipitation step;

(f) adding an antiscalant to said precipitate free liquid to maintain sparingly soluble inorganic material contained in the liquid in solution;

(g) adding precipitate-free liquid containing said antiscalant to the high pressure side of a second membrane suited for separating soluble inorganic from the liquid;

(h) pressurizing said precipitate free liquid on the high pressure side of said second membrane to produce purified permeate on the low pressure side and to provide concentrate sparingly soluble inorganic material in the high pressure side of said second membrane;

(i) removing concentrate sparingly soluble inorganic material in liquid from said high pressure side of said second membrane at a rate sufficient to avoid precipitation of said concentrate sparingly soluble inorganic material on said second membrane;

(j) recovering purified permeate from the low pressure side of said second membrane at a rate of at lest 70% the rate of said adding said stream of aqueous liquid containing said sparingly soluble inorganic material to said body; and (k) recirculating concentrate sparingly soluble inorganic material in liquid for precipitating of said concentrated sparingly soluble inorganic material.

16. The method in accordance with claim 15 including operating said second membrane at a pressure in the range of 100 to 200 psig in excess of said membrane osmotic pressure.

17. The method in accordance with claim 15 including operating said second membrane at a pressure in the range of 500 to 1000 psig.

18. The method in accordance with claim 15 including removing said concentrated soluble inorganic material from the high pressure side of said second membrane at a rate in the range of 25% to 50% of the rate of said adding precipitate-free liquid containing said antiscalant to said high pressure side of said second membrane.

19. The method in accordance with claim 18 including removing said concentrated soluble inorganic material from the high pressure side of said second membrane at a rate in the range of 20% to 30% of the rate of said adding precipitate-free liquid containing said antiscalant to said high pressure side of said second membrane.

20. The method in accordance with claim 15 including the step of adding an inorganic seed to said liquid removed from the high pressure side of said second membrane to precipitate sparingly soluble inorganic material therefrom.

21. The method in accordance with claim 20 wherein said seed is selected from the group consisting of $CaCO_3$, $SiO_2$, $CaSO_4$ and $FeCl_3$.

22. The method in accordance with claim 15 including the step of heating the liquid removed from the high pressure side of said first membrane for precipitating said sparingly soluble inorganic materials.

* * * * *